Figure 1:
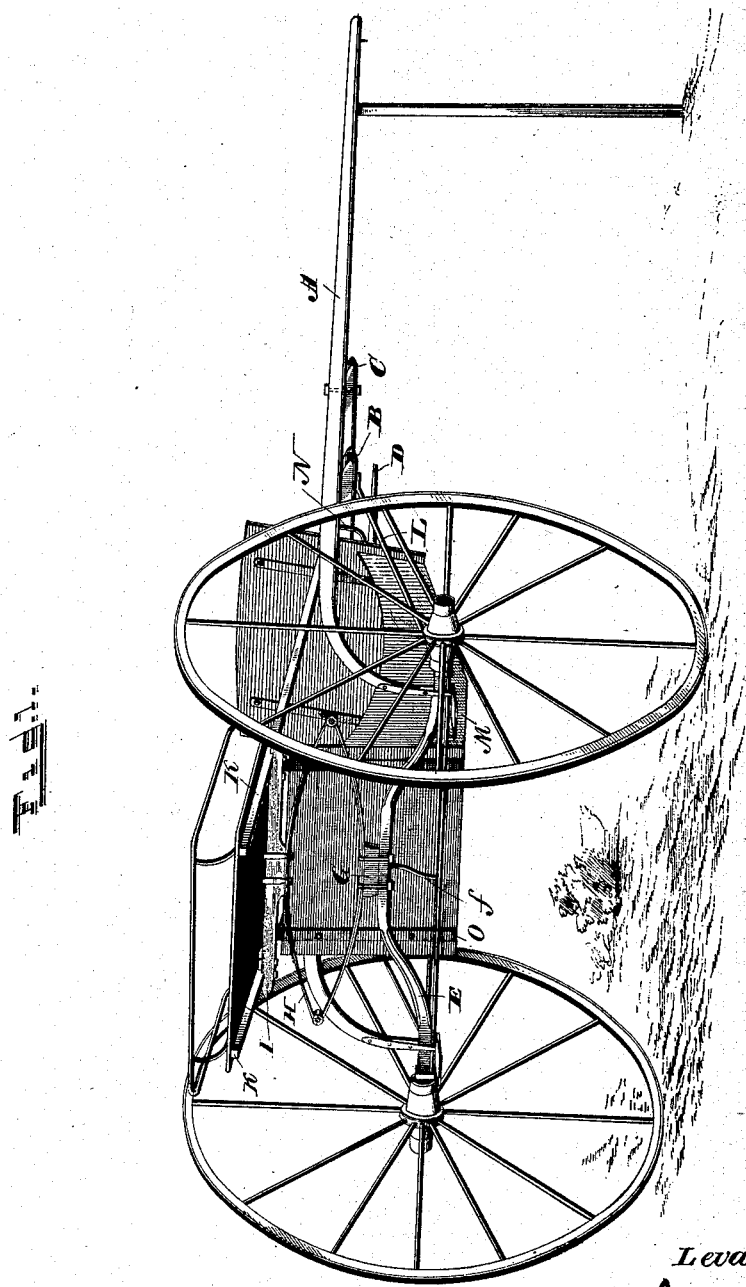

(No Model.) 2 Sheets—Sheet 1.

L. MILLER.
ROAD CART.

No. 388,704. Patented Aug. 28, 1888.

WITNESSES
G. S. Elliott
E. M. Johnson

Levan Miller
INVENTOR
by
Attorney (No Model.) 2 Sheets—Sheet 2.
L. MILLER.
ROAD CART.
No. 388,704. Patented Aug. 28, 1888.
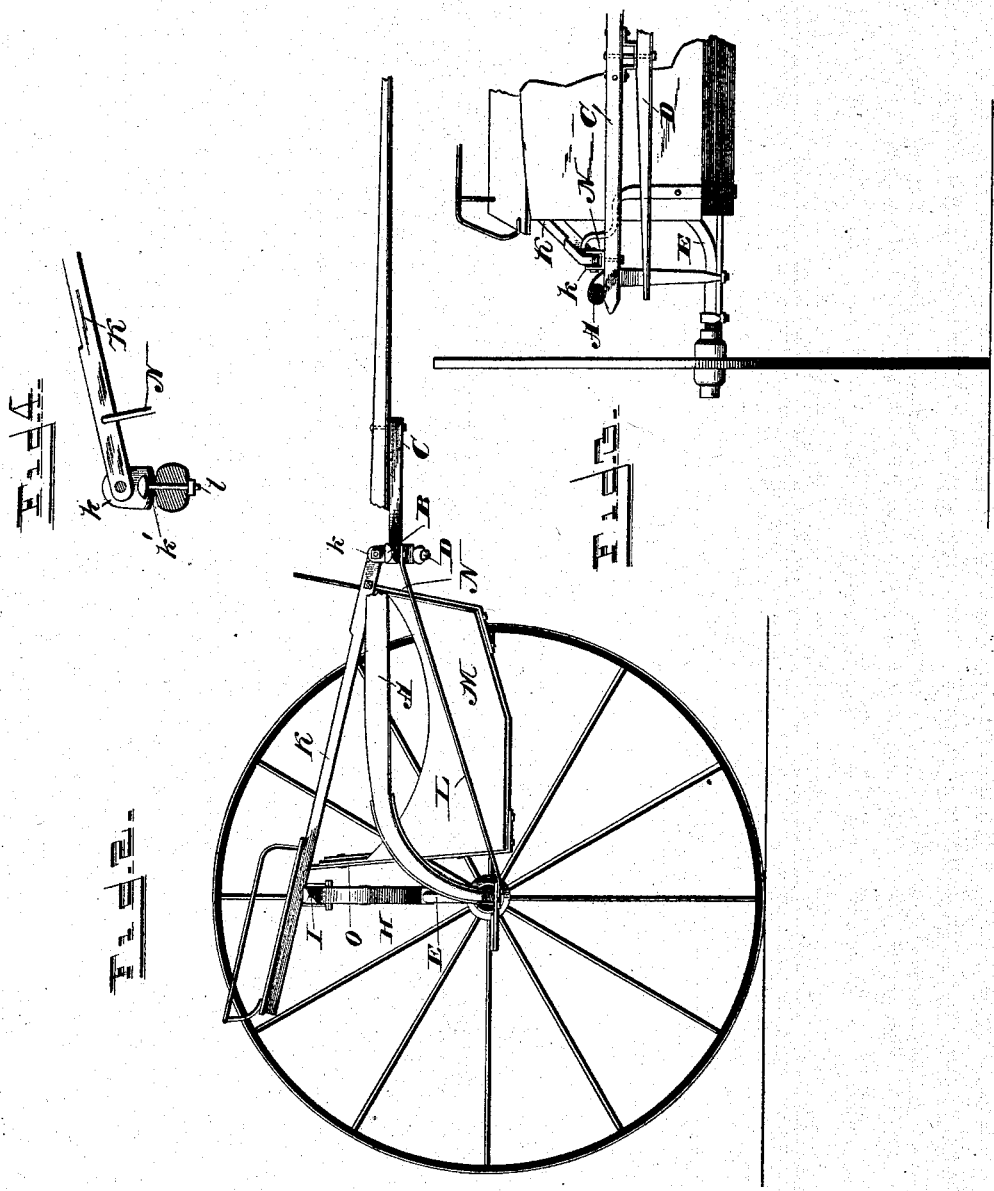
WITNESSES,
J. S. Elliott.
M. Johnson.
Levan Miller.
INVENTOR.
by
Attorney.

UNITED STATES PATENT OFFICE.

LEVAN MILLER, OF DELAWARE, OHIO.

ROAD-CART.

SPECIFICATION forming part of Letters Patent No. 388,704, dated August 28, 1888.

Application filed April 19, 1888. Serial No. 271,153. (No model.)

*To all whom it may concern:*

Be it known that I, LEVAN MILLER, a citizen of the United States of America, residing at Delaware, in the county of Delaware and State of Ohio, have invented certain new and useful Improvements in Road-Carts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in road-carts, the object of the same being to provide a two-wheeled vehicle with means to prevent the movement of the horse being imparted to the seat and body.

The invention further consists in the construction and combination of the parts, as will be hereinafter fully described and specifically claimed.

In the accompanying drawings, Figure 1 is a perspective view of a road-cart constructed in accordance with my invention; Fig. 2, a side view having one of the wheels removed; and Figs. 3 and 4 are detail views, partly in section.

A refers to the thills or shafts of the vehicle, which are provided with a cross-bar, B, rigidly attached thereto, in front of which is centrally secured a brace-bar, C, the outwardly-projecting curved ends thereof being bolted to the shafts. To the under side of the bar B is secured a singletree.

The rear ends of the shafts A are curved downwardly and secured by suitable clips to the axle E, which is curved upwardly centrally, as shown, the ends thereof being connected by a bar or rod, $f$, which is clipped to the ends of the axle and provided centrally with an upwardly-projecting brace, $f$, the upper end of which is rigidly secured to a block, G, the upper surface of which is grooved to correspond with the curve of the elliptical spring H, secured thereto and to the axle by ordinary clips.

To the upper section of the elliptical spring is secured a bar, I, which supports the rear ends of the spring-bars K K, upon which the seat is mounted. These bars K K converge rearwardly and are secured at their forward ends to loops $k$ by suitable pivot-bolts, said loops being U-shaped and provided with slots $k'$, through which bolts $l$, which also pass through the cross-bar B, pass adjacent to the shafts. The heads of the bolts $l$ are arranged so that the loop can have a slight rocking motion upon the bar B.

If desirable, beneath the rounded heads of the bolts $l$, immediately above the slots in the base of the loop, may be placed suitable elastic washers.

Brace-bars are secured to the under side of the cross-bar B at their forward ends, and extending rearwardly are secured to the axle by the same clips which attach the ends of the shafts thereto, these clips also serving to hold in place steps. Steps are also secured to the shafts immediately in rear of the cross-bar B, so as to be located in front of the wheels.

The body M of the vehicle may be of ordinary construction, suitably braced by straps, and is secured forwardly to the spring-bars K K by spring connecting-strips N, the upper ends of which are bent outwardly to pass through openings in the spring-bars in rear of the loops $k$, from which they extend downwardly, and passing under the body form straps for bracing the same. The rear end of the body is supported by being attached to the bar I by spring-metal strips O, which are merely continuations of the straps N hereinbefore referred to.

The elliptical springs hereinbefore described will not only permit the body to have an upward and downward movement, but also that imparted by the movement of the horse. The spring-bars K K, having, by reason of their front connections, a slight rearward and forward movement, will allow this play of the spring to be utilized.

The front portion of the body being pivotally secured by the spring-connections N, pivoted to the spring-bars K, may have a slight lateral movement as well as a pivotal movement. The spring bars O at the rear of the body will act in connection with the pivoted spring-bars N. The body is about the same width throughout, being of the same width as the bars K at their juncture with the seat, and as these spring-bars converge rearwardly a space is provided whereby a person can readily get in and out of the vehicle by mounting the rear steps, as well as from the front. The curved bar C not only serves as a brace for the shafts, but permits the horse to be hitched much closer to the vehicle than is customary.

Having thus described my invention, I claim—

1. The combination, in a road-cart, of the shafts A, provided with cross-bars B and C, an axle curved upwardly centrally, a brace bar or rod, F, with a central member, $f$, brace-bars L, extending from the axle to the cross-bar B, converging spring-bars K K, pivotally attached to the cross-bar B, the rear ends thereof being secured to a bar, I, attached to the upper portion of the rear spring, an overhanging seat mounted upon the rear ends of the spring-bars K, and a body suspended from the bar I and pivotally from the spring-bars K by means of spring-connections N, the parts being organized substantially as shown, and for the purpose set forth.

2. The combination, in a road-cart constructed substantially as described, of the converging spring-bars K K, upon which the seat is mounted, loops $k\ k$, to which the front ends of the spring-bars are pivotolly secured, said loops being connected to the cross-bar B, so as to have a rocking movement thereon, and an elliptical spring connecting the rear portion of the spring-bars to the axle, substantially as shown, and for the purpose set forth.

In testimony whereof I affix my signature in presence of two witnesses.

LEVAN MILLER.

Witnesses:
 THOMAS CRAVEN,
 PATRICK S. ENGLISH.